(12) United States Patent
Hamana (10) Patent No.: US 11,341,773 B2
(45) Date of Patent: May 24, 2022

(54) DETECTION DEVICE AND CONTROL METHOD OF THE SAME

(71) Applicant: CANON KABUSHIKI KAISHA, Tokyo (JP)

(72) Inventor: Akihiro Hamana, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/659,635

(22) Filed: Oct. 22, 2019

(65) Prior Publication Data
US 2020/0134299 A1 Apr. 30, 2020

(30) Foreign Application Priority Data

Oct. 25, 2018 (JP) .............................. JP2018-201161

(51) Int. Cl.
| | |
|---|---|
| *G06K 9/00* | (2022.01) |
| *G06V 40/20* | (2022.01) |
| *G06T 7/20* | (2017.01) |
| *G08B 13/196* | (2006.01) |
| *G06V 20/52* | (2022.01) |
| *G06V 40/10* | (2022.01) |
| *G08B 3/10* | (2006.01) |

(52) U.S. Cl.
CPC .............. *G06V 40/20* (2022.01); *G06T 7/20* (2013.01); *G06V 20/52* (2022.01); *G06V 40/103* (2022.01); *G08B 13/196* (2013.01); *G06T 2207/10016* (2013.01); *G06T 2207/30196* (2013.01); *G06T 2207/30232* (2013.01); *G08B 3/10* (2013.01)

(58) Field of Classification Search
CPC .......... G06K 9/00335; G06K 9/00369; G06K 9/00771; G06T 7/20; G06T 2207/10016; G06T 2207/30196; G06T 2207/30232; G08B 13/196; G08B 3/10; G08B 13/19645; G08B 13/19602
See application file for complete search history.

(56) References Cited

U.S. PATENT DOCUMENTS 7,227,893 B1 * 6/2007 Srinivasa ........... G06K 9/00771
348/155
9,336,436 B1 * 5/2016 Dowdall ............ G06K 9/00362
(Continued)

FOREIGN PATENT DOCUMENTS

| JP | H0950585 A | | 2/1997 | |
|---|---|---|---|---|
| JP | 2006/027481 | * | 2/2006 | ............. B60R 21/00 |

(Continued)

*Primary Examiner* — Amara Abdi
(74) *Attorney, Agent, or Firm* — Carter, DeLuca & Farrell LLP (57) ABSTRACT

In order to detect an object by discriminating the object in accordance with the state of the object, a detection device comprises: an identifying unit configured to identify whether a human included in a plurality of frame images of a moving image is a pedestrian; a determining unit configured to determine, for notifying, that the human is the pedestrian if the identifying unit identifies that the number of times the human is the pedestrian satisfies a predetermined condition; and a notifying unit configured to notify intrusion if the human determined as the pedestrian by the determining unit intrudes into an area preset for the moving image.

8 Claims, 9 Drawing Sheets

(56) References Cited

U.S. PATENT DOCUMENTS

| | | | |
|---|---|---|---|
| 2005/0157929 A1* | 7/2005 | Ogasawara | G06K 9/00369 |
| | | | 382/181 |
| 2007/0237387 A1 | 10/2007 | Avidan | |
| 2010/0123770 A1* | 5/2010 | Friel | H04N 7/15 |
| | | | 348/14.08 |
| 2018/0005069 A1* | 1/2018 | Shibata | G06K 9/00362 |
| 2020/0012848 A1* | 1/2020 | Goto | G06K 9/00375 |
| 2020/0023839 A1* | 1/2020 | Yan | B60W 40/09 |
| 2020/0189467 A1* | 6/2020 | Kondo | G01S 13/62 |

FOREIGN PATENT DOCUMENTS

| | | |
|---|---|---|
| JP | 2006027481 A | 2/2006 |
| JP | 2014006700 A | 1/2014 |
| JP | 2014229010 A | 12/2014 |

* cited by examiner

| FACE | HEAD | UPPER BODY | WHOLE BODY | DETERMINATION |
|---|---|---|---|---|
| × | × | × | × | UNKNOWN |
| ○ | × | × | × | DRIVING |
| × | ○ | × | × | DRIVING |
| ○ | ○ | × | × | DRIVING |
| × | × | ○ | × | UNKNOWN |
| × | ○ | × | ○ | WALKING |
| ○ | ○ | ○ | ○ | WALKING |

FIG. 4

| FRAME | t | t-1 | t-2 | t-3 | t-4 | t-5 |
|---|---|---|---|---|---|---|
| FACE | × | × | ○ | × | × | × |
| HEAD | × | ○ | ○ | ○ | × | × |
| UPPER BODY | ○ | ○ | ○ | × | ○ | × |
| WHOLE BODY | × | ○ | ○ | ○ | ○ | × |
| STATE | UNKNOWN | WALKING | WALKING | WALKING | WALKING | UNKNOWN |

401 — FRAME
402 — FACE
403 — HEAD
404 — UPPER BODY
405 — WHOLE BODY
406 — STATE

| 901 FRAME | t | t-1 | t-2 | t-3 | t-4 | t-5 | 906 NUMBER OF TIMES OF DETECTION |
|---|---|---|---|---|---|---|---|
| 902 FACE | × | × | ○ | × | × | × | 1 |
| 903 HEAD | × | ○ | ○ | ○ | × | × | 3 |
| 904 UPPER BODY | ○ | ○ | ○ | × | ○ | × | 4 |
| 905 WHOLE BODY | × | ○ | ○ | ○ | ○ | × | 4 |

FIG. 10

DETECTION DEVICE AND CONTROL METHOD OF THE SAME

BACKGROUND OF THE INVENTION

Field of the Invention

The present invention relates to a technique of detecting an object contained in a video.

Description of the Related Art

To secure the safety of facilities such as an apartment, a building, a schoolhouse, a station building, and an airport, a system in which a monitoring camera is installed and the intrusion of a human into the facility is detected by analyzing a video obtained by the monitoring camera has been introduced. US-2007-0237387 discloses a technique of detecting a human body by cascade-connecting strong discriminators for detecting a portion of the body, in regard to detection of a human body region in a video. Also, Japanese Patent Laid-Open No. 9-50585 discloses an intruder monitoring apparatus for determining whether a human has intruded into an inhibited area on an image.

Figure 1:
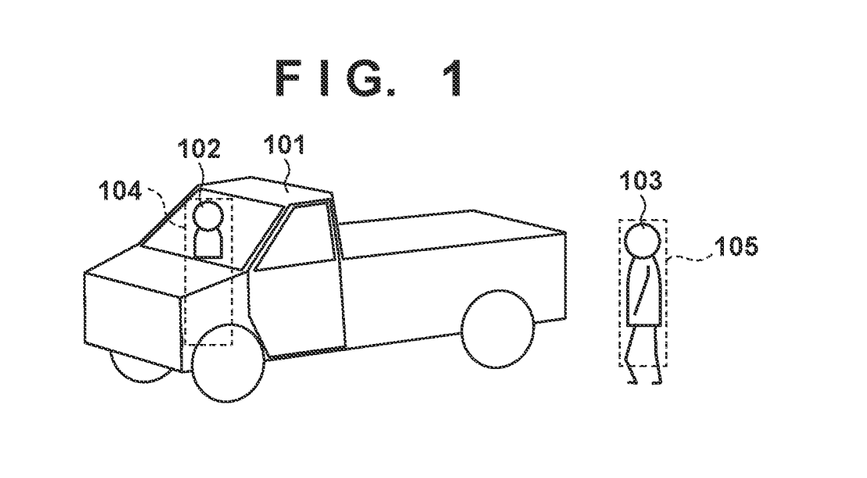
FIG. 1 is a view for explaining an example of intrusion detection.

In the above-described techniques, a human body contained in a video is detected without discriminating the state of the human body. When a video as shown in FIG. 1 is obtained by a camera, therefore, a human body (driver 102) in a vehicle 101 and a human body (pedestrian 103) walking on a street are detected. For example, it is determined that human bodies are detected in broken-line rectangles 104 and 105, and tracking is started. Then, a warning indicating the detection of an intruder is output by using, as a trigger, an event in which, for example, the human body currently being tracked passes an intrusion detection line. That is, it is impossible to cope with a use case in which the entrance of a vehicle needs to be excluded from detection targets (=a human body in a vehicle needs to be excluded from detection targets).

SUMMARY OF THE INVENTION

According to one aspect of the present invention, a detection device comprises: an identifying unit configured to identify whether a human included in a plurality of frame images of a moving image is a pedestrian; a determining unit configured to determine, for notifying, that the human is the pedestrian if the identifying unit identifies that the number of times the human is the pedestrian satisfies a predetermined condition; and a notifying unit configured to notify intrusion if the human determined as the pedestrian by the determining unit intrudes into an area preset for the moving image.

According to another aspect of the present invention, a detection device comprises: a detecting unit configured to detect, from each frame image, a portion of a body of a human included in a plurality of frame images of a moving image; a determining unit configured to determine, for notifying, that a human included in the plurality of frame images is a pedestrian if the number of times the detecting unit detects a predetermined portion of the body satisfies a predetermined condition; and a notifying unit configured to notify intrusion if the human determined as the pedestrian by the determining unit intrudes into an area preset for the moving image.

The present invention makes it possible to detect an object by discriminating the object in accordance with the state of the object.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Examples of embodiments of the present invention will be explained in detail below with reference to the accompanying drawings. Note that the following embodiments are merely examples, and are not intended to limit the scope of the present invention.

First Embodiment

The first embodiment of a detection device according to the present invention will be explained below by taking, as an example, a detection system including a camera for imaging a predetermined monitoring area, and a detection device for detecting an object in a moving image obtained by the camera. A human body is assumed as an object to be detected in the following explanation, but the object to be detected may also be another object.

<System Configuration>

Figure 5:
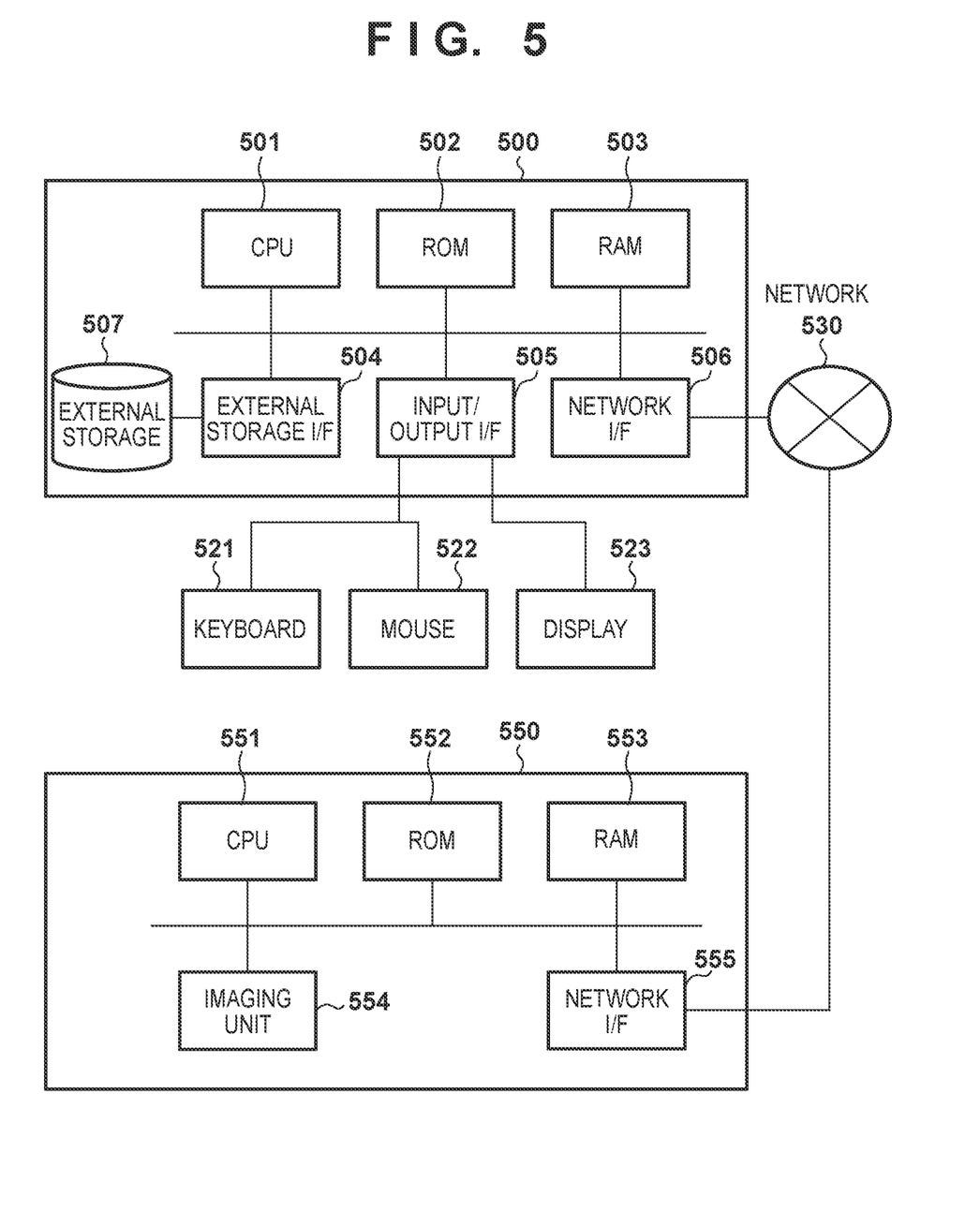
FIG. 5 is a view exemplarily showing the hardware configuration of a detection system.

FIG. 5 is a view exemplarily showing the hardware configuration of the detection system. As described above, the detection system includes a detection device 500 and a camera 550. Note that the detection device 500 receives a video from one camera 550 across a network 530 in FIG. 5, but may also receive videos from a plurality of cameras. In addition, the detection device 500 can also incorporate a camera and directly obtain a video without using the network 530.

The detection device 500 includes a CPU 501, a ROM 502, a RAM 503, an external storage I/F 504, an input/output I/F 505, and a network I/F 506. The ROM 502 stores programs to be executed by the CPU 501 and various kinds of setting data. The CPU 501 reads out the programs stored in the ROM 502 to the RAM 503 and executes them, thereby implementing functional units to be described later with reference to FIG. 6.

The external storage I/F 504 is an interface for connecting an external storage device 507 such as a hard disk drive (HDD). The input/output I/F 505 is an interface for connecting to input devices such as a keyboard 521, a mouse 522, and a touch panel (not shown), and an output device such as a display 523. The network I/F 506 is an interface for communicating with an external apparatus such as the camera 550 by connecting to the network 530. The detection device 500 can be implemented by, for example, a versatile PC (Personal Computer), a smartphone, or a tablet, and does not depend on any specific device form.

The camera 550 includes a CPU 551, a ROM 552, a RAM 553, an imaging unit 554, and a network I/F 555. The ROM 552 stores programs to be executed by the CPU 551 and various kinds of setting data. The CPU 551 reads out the programs stored in the ROM 552 to the RAM 553 and executes them, thereby implementing an imaging process to be performed by the imaging unit 554 and a communication process to be performed by the network I/F 555. The imaging unit 554 includes an imaging optical system and an imaging element such as a CCD or a CMOS, and generates a moving image (a plurality of frame images) by imaging. The imaging unit 554 may also perform compression encoding or the like.

Figure 6:
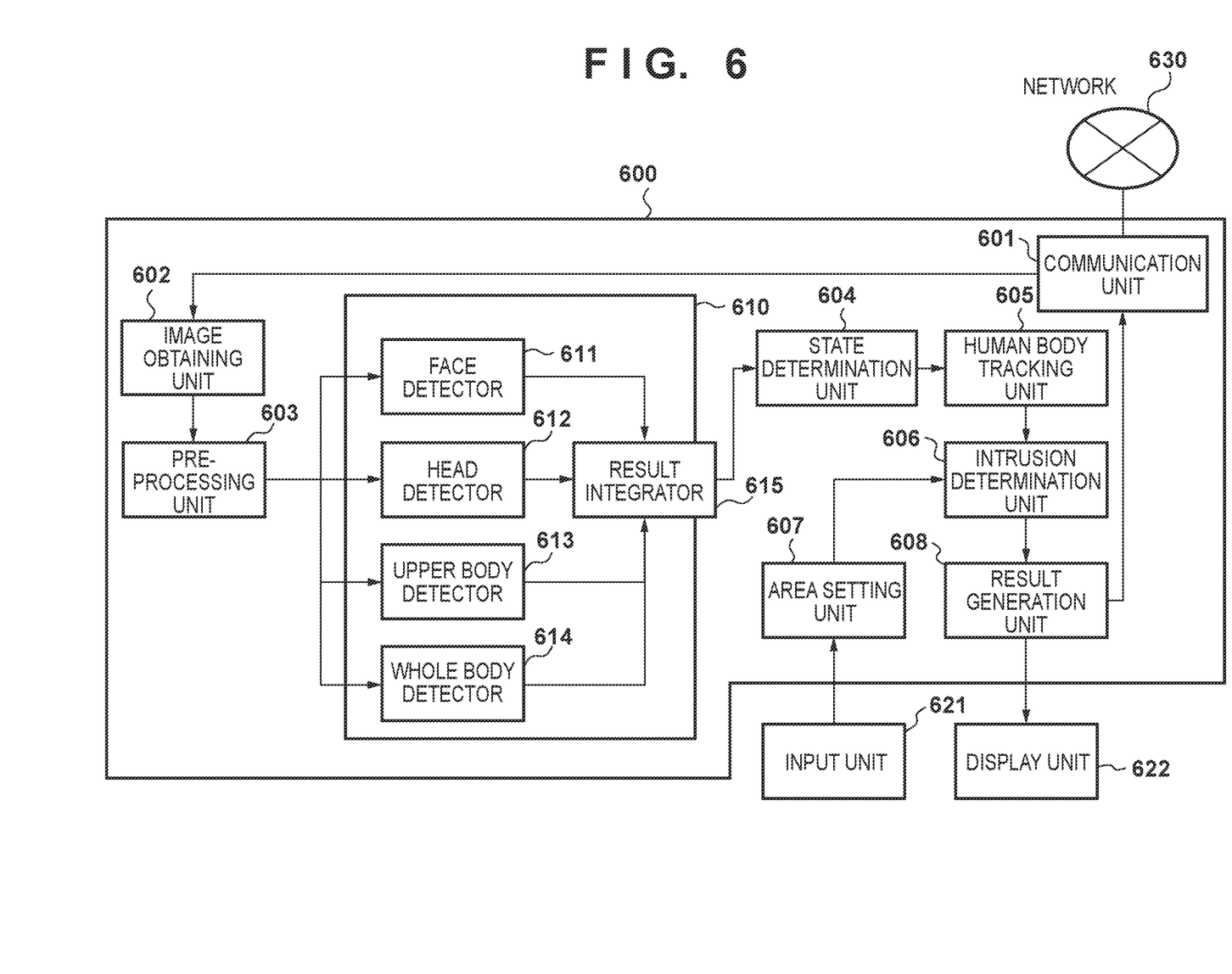
FIG. 6 is a view exemplarily showing the functional configuration of a detection device.

FIG. 6 is a view exemplarily showing the functional configuration of the detection device. As functional units, the detection device 600 includes a communication unit 601, an image obtaining unit 602, a pre-processing unit 603, a human body detection unit 610, a state determination unit 604, a human body tracking unit 605, an intrusion determination unit 606, a result generation unit 608, and an area setting unit 607. The human body detection unit 610 includes a plurality of detectors for detecting different target portions (a face detector 611, a head detector 612, an upper body detector 613, and a whole body detector 614), and a result integrator 615.

The communication unit 601 executes communication with an external apparatus across the network 630. For example, the communication unit 601 receives a compression-encoded moving image from the camera 550. The image obtaining unit 602 decodes the obtained moving image, and stores the image as, for example, a plurality of frame images in the external storage device 507. The pre-processing unit 603 corrects the frame image so as to facilitate extracting a feature amount.

The human body detection unit 610 detects a human body contained in the frame image. More specifically, the human body detection unit 610 detects a human body by executing a detection process in each of the face detector 611, the head detector 612, the upper body detector 613, and the whole body detector 614, and integrating the detection results by the result integrator 615. Details of the detection process will be described later with reference to FIGS. 2, 3A, and 3B.

Figure 2:
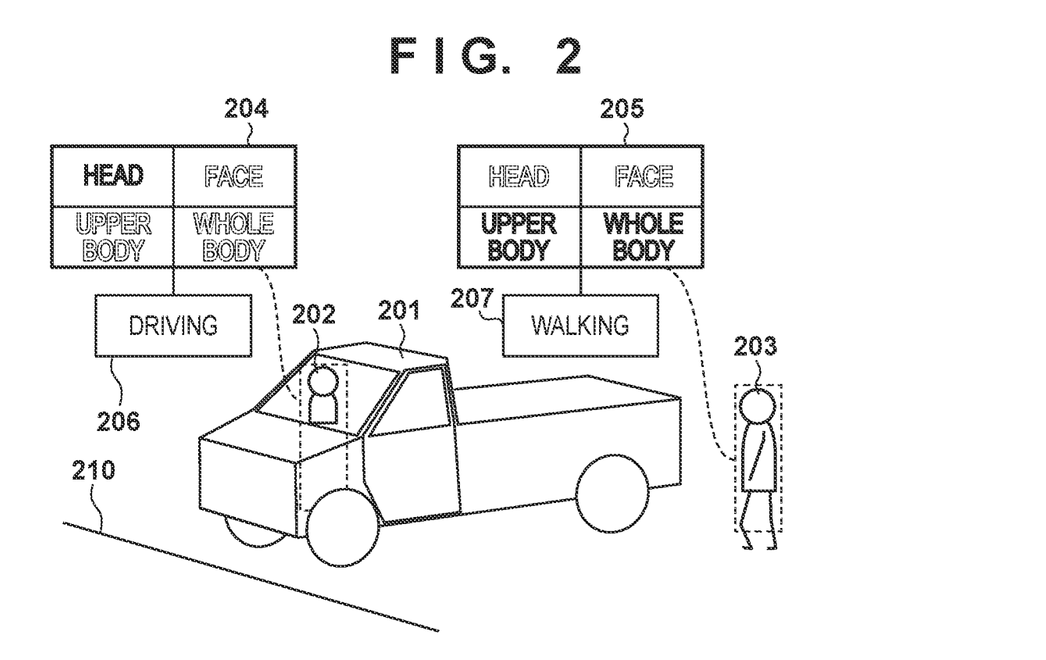
FIG. 2 is a view for explaining the principle of intrusion detection according to the first embodiment.

The state determination unit 604 determines a human body state detected by the human body detection unit 610 based on a result integrated by the result integrator 615. In this case, the state determination unit 604 determines whether the human body is a driver or a pedestrian. The human body tracking unit 605 associates figures of a human body detected by the human body detection unit 610 with each other between a plurality of frame images, thereby tracking the human body together with human body information such as the human body state. The area setting unit 607 sets an image area as a predetermined area in which intrusion detection is determined. In this embodiment, as shown in FIG. 2, assume that a boundary line is set as an intrusion detection line having a linear (line segment) shape in an imaging area indicated by the moving image. However, the intrusion detection line may also be set as a polyline, a curved line, or a combination thereof. It is also possible to set an intrusion detection area having an arbitrary shape. When setting an area, intrusion detection is determined under the condition that a target human body exists inside the area for a predetermined time or more.

The intrusion determination unit 606 determines the intrusion of a human body as a detection target in accordance with the setting by the area setting unit 607. The result generation unit 608 generates information of the detection result obtained by the intrusion determination unit 606, and performs alarm notification. For example, the result generation unit 608 displays and notifies a warning and generates and notifies a warning sound to the output unit 622, or notifies an external apparatus (not shown) of a warning across the network 630.

<Principle of Intrusion Detection>

FIG. 2 is a view for explaining the principle of intrusion detection according to the first embodiment. Like FIG. 1, FIG. 2 shows a state in which the camera obtains a video containing a human body (driver 202) in a vehicle 201 and a human body (pedestrian 203) walking on a street.

An intrusion detection line 210 is set in the video, and the detection device performs intrusion detection determination if a human passes the intrusion detection line 210. Portion detection information 204 and portion detection information 205 exemplarily show information indicating the detection results of four portions detected by the four discriminators included in the detection device.

In the first embodiment, the detection device determines the states 206 and 207 of the human bodies 202 and 203 having passed the intrusion detection line 210, based on the pieces of portion detection information 204 and 205, thereby time-serially holding the states as the state histories of the human bodies. In this case, the detection device determines based on the state history of the human body whether the human body is during "driving" or "walking". In this case, only the human body 203 determined as the human body who is "walking" a predetermined number of times as the state of the human body is determined as an intruder, and the detection device performs warning notification. That is, if the detection device determines that the human body 202 who is driving the vehicle is not an intruder; the detection device does not perform warning notification. On the other hand, the detection device determines that the human body 203 who is walking (a human body who is not during driving) is an intruder, and performs warning notification. Note that the state of a human body in a vehicle is expressed as "driving" in this embodiment for the sake of convenience, but the same shall apply to other vehicle passengers (human bodies in the passenger seat and rear seat).

Figure 3A:
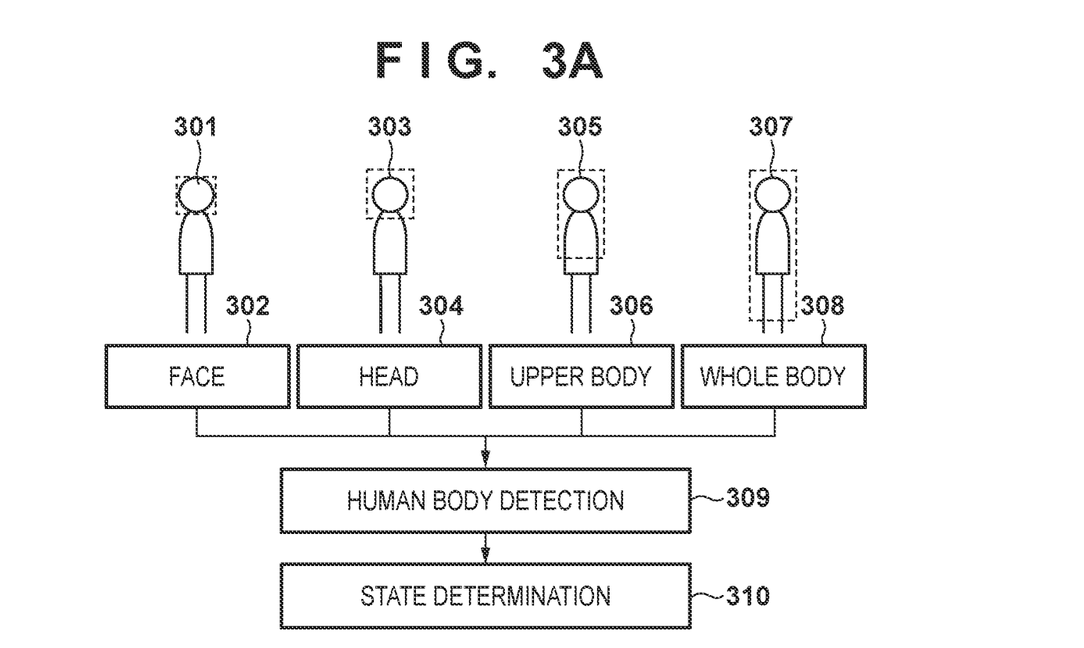
FIGS. 3A and 3B are views for explaining a human body state determination logic based on detection of a plurality of portions.
Figure 3B:
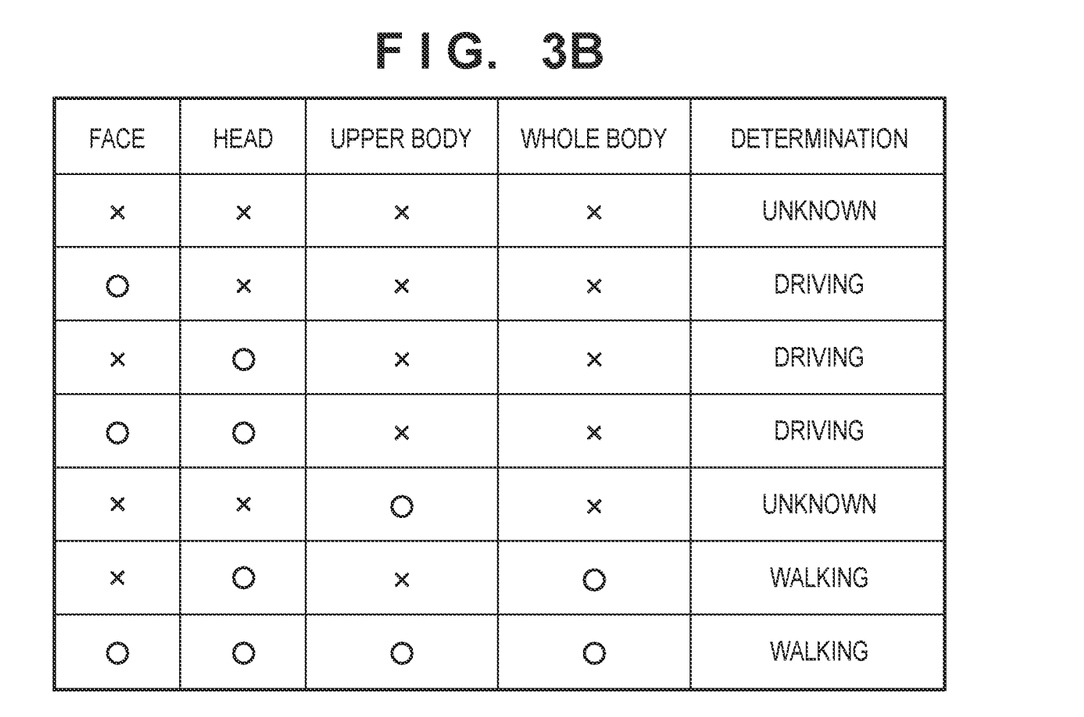

FIGS. 3A and 3B are views for explaining the human body state determination logic based on the detection of a plurality of portions. FIG. 3A shows the procedure of a human body state determination process. FIG. 3B shows a table indicating the determination results based on combination patterns of the portion detection results.

Discriminators 302, 304, 306, and 308 perform detection processes corresponding to different portions (body regions) of a human body in a frame image. The discriminators 302, 304, 306, and 308 respectively correspond to the face detector 611, the head detector 612, the upper body detector 613, and the whole body detector 614 shown in FIG. 6. That is, in the first embodiment, "a face 301", "a head 303", "an upper body 305", and "a whole body 307" are assumed as "portions".

Each discriminator (strong discriminator) is obtained by, for example, cascade-connecting a plurality of weak discriminators. The weak discriminator detects a pattern of an image feature such as the edge or the color. Note that an optimum detection pattern of an image feature can be obtained by machine learning.

In a human body detection process 309, a human body is detected based on the portion detection results obtained by the discriminators (strong discriminators). The human body detection 309 corresponds to the result integrator 615 shown in FIG. 6. Note that the detection results can be integrated by using, for example, an evaluation function using the weighted sum of the individual portions.

A state determination process 310 determines the state of the human body based on the portion detection results obtained by the discriminators (strong discriminators). In this embodiment, whether the detected human body is a human body who is "driving", "walking", or "unknown" indicating neither, is determined based on a combination pattern of the portion detection results.

For example, as shown in FIG. 3B, if at least one of the face and the head is detected in a frame image and other portions are not detected, it is determined that the state of the human body is during "driving". If the whole body is detected in a frame image, it is determined that the state of the human body is during "walking". If the state does not belong to any of the patterns, the state of the human body is set as a human body who is "unknown". Note that in the table shown in FIG. 3B, "○" indicates that the corresponding target is detected, and "x" indicates that the corresponding target is not detected. Note that the table shown in FIG. 3B is merely an example, and it is also possible to use a combination of other human body portions, or determine another state. Note also that two or more detectors of the above-described four detectors can be used as the plurality of detectors included in the human body detection unit 610. For example, the human body detection unit 610 includes the head detector 612 and the whole body detector 614, and the state is determined based on the detection results obtained by the two detectors.

Figure 4:
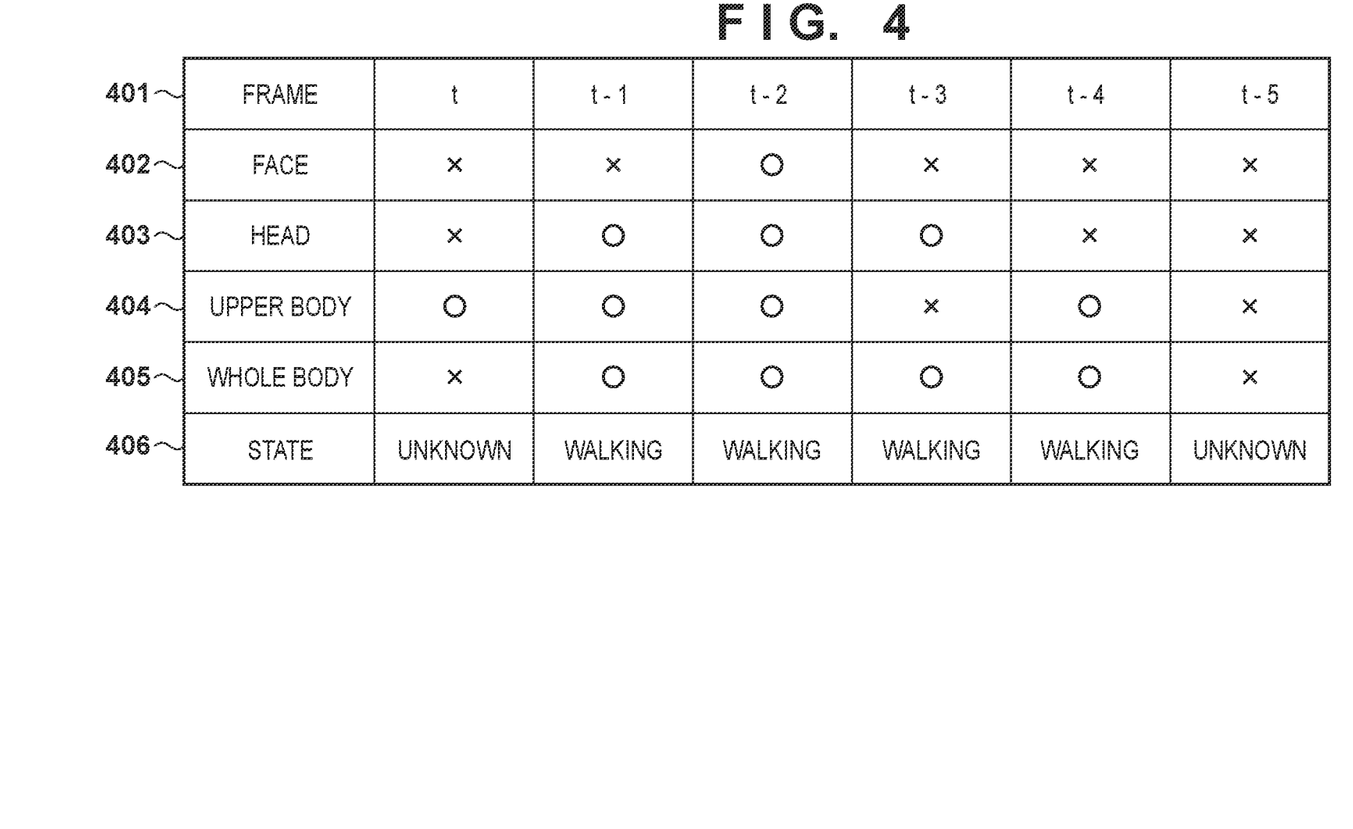
FIG. 4 is a view showing an example of a human body information data structure.

FIG. 4 is a view showing an example of a human body information data structure in the first embodiment. An item 401 indicates the frame timing (time and frame number) of an image having undergone portion detection. For example, "t" indicates the latest frame, "t-1" is the immediately preceding frame, and "t-2" is the second preceding frame. Items 402 to 405 indicate the pieces of portion detection information for the image by the four detectors. An item 406 indicates the state of the human body discriminated based on the portion detection information of each frame.

In this case, in the item 406, the state discrimination result of each frame is changed because fluctuations are present in the pieces of portion detection information of the respective portions in the items 402 to 405. This is because the output result of the strong discriminator of each portion is unstable in some cases and an error occurs in the detection result. For this reason, a correct detection result is not always obtained in the preceding and succeeding frames at timings when the human body passes the intrusion detection line 210. Accordingly, in the first embodiment, the history of the state discrimination results of several latest frames at timings when the human body passes the intrusion detection line 210 is used. For example, in several latest frames, if the state of the human body is during "driving" in the half or more of the several latest frames, the human body is determined as a driver. In the several latest frames, if the state of the human body is during "walking" in the half or more of the several latest frames, the human body is determined as a walker; otherwise, the state of the human body is determined as "unknown".

Figure 7:
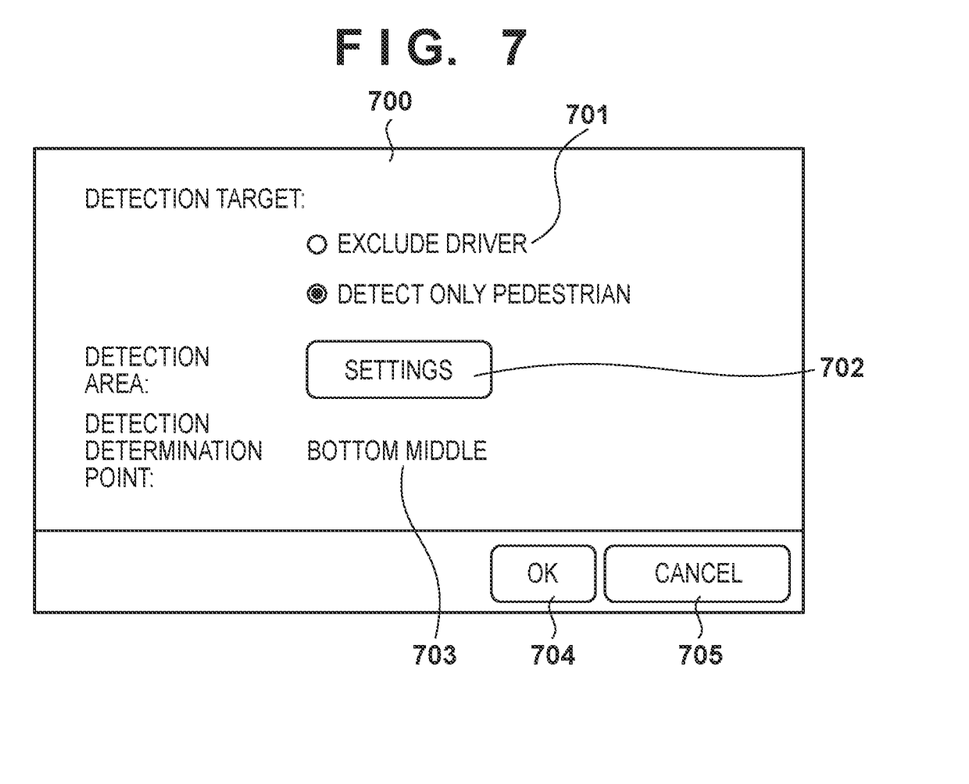
FIG. 7 is a view showing an example of a screen for setting the conditions of intrusion detection.

FIG. 7 is a view showing an example of a screen for setting the conditions of intrusion detection. Assume that the settings of a detection target, a detection area, and a detection determination point are accepted via a dialogue 700 displayed on the display 523. It is, of course, also possible to further accept other conditions. In this example, the dialogue 700 includes a radio button 701 for selecting a detection target, a setting button 702 for setting an area, and display 703 for displaying a detection determination point. The dialogue 700 also includes an OK button 704 for determining the settings, and a cancel button 705 for discarding the settings.

The radio button 701 for selecting a detection target accepts one selection from a plurality of options in accordance with a clicking operation by the mouse 522 in order to limit intrusion detection targets. For example, "exclude driver" excludes a human body found to be during "driving" from intrusion detection targets. That is, a human body found to be during "walking" or found to be "unknown" is an intrusion detection target. Also, "detect only pedestrian" excludes both a human body found to be during "driving" and a human body found to be "unknown" from intrusion detection targets.

The setting button 702 accepts the setting of an area in which intrusion detection is determined. For example, when the setting button 702 is clicked by the mouse 522, the scene shown in FIG. 2 is displayed, and a user interface (UI) for accepting changing of the intrusion detection line 210 is displayed. This UI is equivalent to the area setting unit 607 shown in FIG. 6. As described previously, it is possible to set either an intrusion detection line or an intrusion detection area. Also, the display 703 for a detection determination point indicates a detection point in the intrusion detection determination area. As the detection point, it is possible to set foot, middle, right, left, or the like.

<Operation of Device>

Figure 8:
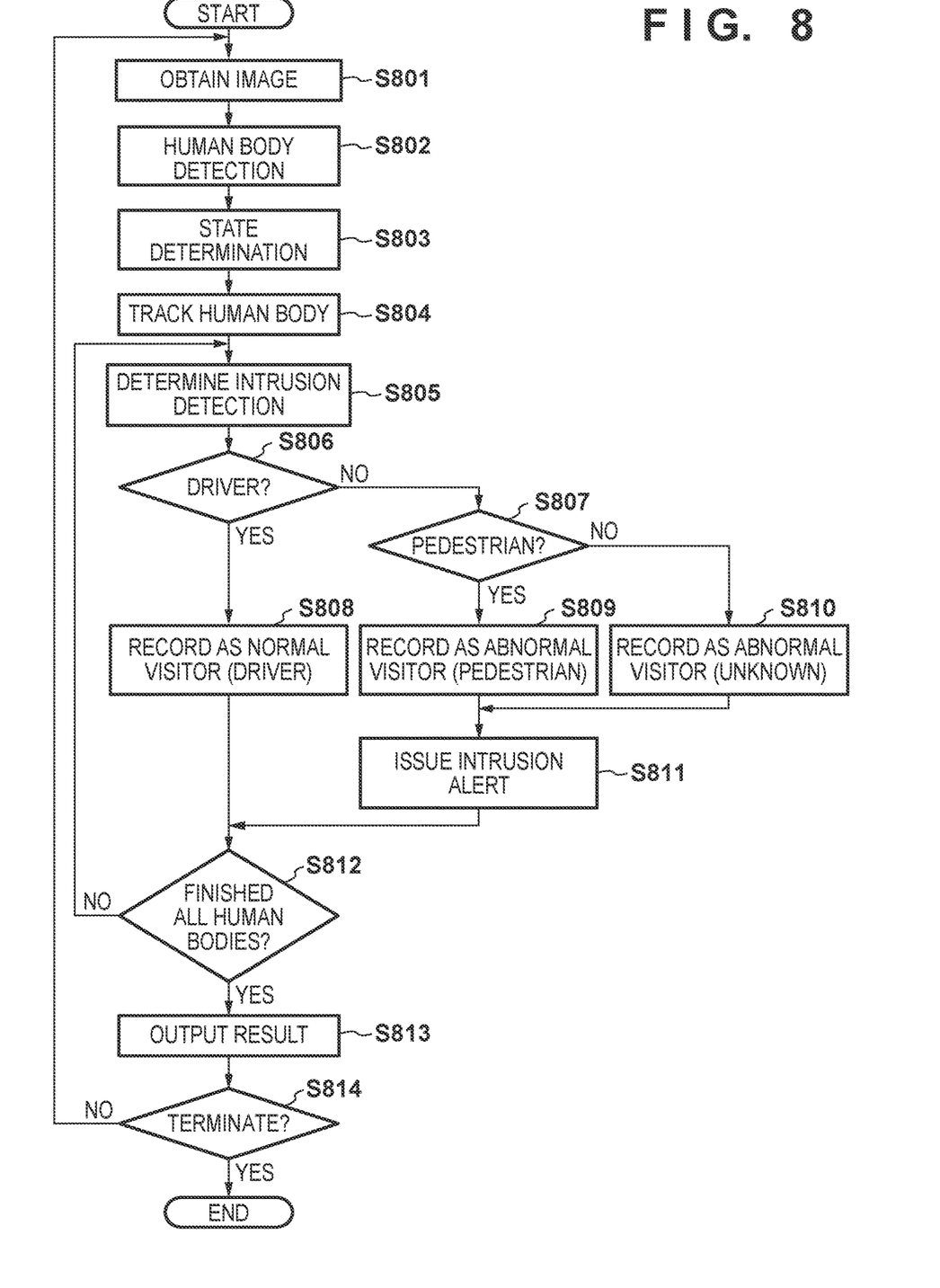
FIG. 8 is a flowchart of an intrusion detection process according to the first embodiment.

FIG. 8 is a flowchart of the intrusion detection process according to the first embodiment. As described earlier, the CPU 501 implements the functional units shown in FIG. 6 by reading out the programs stored in the ROM 502 to the RAM 503 and executing them.

In step S801, the image obtaining unit 602 obtains a moving image from the camera 550 across the network 630. Then, the image obtaining unit 602 decodes the obtained moving image, and stores the decoded image as a plurality of frame images in the external storage device 507.

In step S802, the pre-processing unit 603 corrects each frame image so as to facilitate extracting a feature amount, and the human body detection unit 610 detects a human body contained in the frame image. As described above, the four detectors 611 to 614 perform the processes of detecting the four portions (face, head, upper body, and whole body) of the human body. Then, the result integrator 615 integrates the detection results of the four detectors, thereby detecting the human body.

In step S803, the state determination unit 604 determines (temporary determination) the state of the human body based on the detection results of the four portions (the face, the head, the upper body, and the whole body) of the human body for each frame. More specifically, it is determined by the method described with reference to FIGS. 3A and 3B whether the human body is during "driving" or "walking", or is "unknown". Note that the state determination may be performed for all the frames or some thinned frames (for example, every predetermined frame interval).

In step S804, the human body tracking unit 605 tracks the human body detected by the human body detection unit 610 over the plurality of frame images. For example, the log is held by linking the detection results of the human body in the preceding (=past) frame images. Assume that in the first embodiment, all human bodies detected by the human body detection unit 610 are tracked.

In step S805, the intrusion determination unit 606 determines the intrusion of a detection target human body in accordance with the setting by the area setting unit 607. For example, the intrusion determination unit 606 determines whether the moving vector of the human body crosses the intrusion detection line 210 in a predetermined direction.

In step S806, the state determination unit 604 determines (actual determination) the state of the human body crossing the intrusion detection line 210. More specifically, the state determination unit 604 determines whether the human body is a driver, a pedestrian, or unknown by the method explained with reference to FIG. 4. The determination is performed using the history of the state discrimination results of the several latest frames at timings when the human body passes through the intrusion detection line 210. The process advances to step S808 if the human body is a driver, and advances to step S807 if the human body is not a driver (that is, if the human body is a pedestrian or unknown). If the human body is a pedestrian in step S807, the process advances to step S809. If the human body is not a pedestrian (that is, if the human body is unknown), the process advances to step S810.

In step S808, the intrusion determination unit 606 records that the target human body is a normal visitor. On the other hand, in step S809, the intrusion determination unit 606 records that the target human body is an abnormal visitor (pedestrian). In step S810, the intrusion determination unit 606 records that the target human body is an abnormal visitor (unknown). After recording the abnormal visitor in step S809 or S810, in step S811, the intrusion determination unit 606 issues an intrusion detection event.

In step S812, the intrusion determination unit 606 determines whether the intrusion detection determination in step S805 is performed on all human bodies detected in step S802 and tracked in step S804. If there is an undetermined human body, the process returns to step S805, and the intrusion determination unit 606 performs determination on the remaining human body. If the determination on all human bodies is complete, the process advances to step S813.

In step S813, if an intrusion alert is issued, the result generation unit 608 performs alarm notification to make the user recognize the detection of the abnormal visitor. For example, the result generation unit 608 displays, and notifies a warning or generates and notifies a warning sound to the output unit 622, or notifies an external apparatus (not shown) of a warning across the network 630.

In step S814, the detection device 500 performs termination determination. For example, the detection device 500 terminates the process if the user inputs a termination instruction. If there is no instruction, the detection device 500 returns to step S801, and continues the process.

In the first embodiment as described above, a human body is detected based on the detection results of the plurality of detectors, and the state of the human body is temporarily determined. The state of the human body is actually determined based on the temporary determination result of the state of the human body for the plurality of frames. Then, the issue of an intrusion alert is controlled based on the determined state. For example, if the human body is found to be a driver, the issue of an intrusion alert is restrained. This makes it possible to restrain, for example, alarm notification on the intrusion of a vehicle (the intrusion of a human body in the vehicle). That is, it is possible to cope with a use case in which the entrance of a vehicle needs to be excluded from detection targets. Even if the fluctuations occur in the strong discriminator of each portion (even if an error is included in the detection result), the state of the human body can be determined with high accuracy.

Note that a human body is assumed as a detection target object in the above explanation, but various objects can be designated as detection target objects. That is, it is possible to designate an object that can take a plurality of states based on the detection results of a plurality of discriminators.

Second Embodiment

Another method of determining the state of a human body will be described in the second embodiment. More specifically, the discrimination of the state of the human body is performed based on the number of times of detection of each portion in several latest frames. The principle of intrusion detection, the hardware configuration, and the functional configuration are similar to those in the first embodiment (FIGS. 2, 5, and 6), and a description thereof will be omitted.

Figure 9:
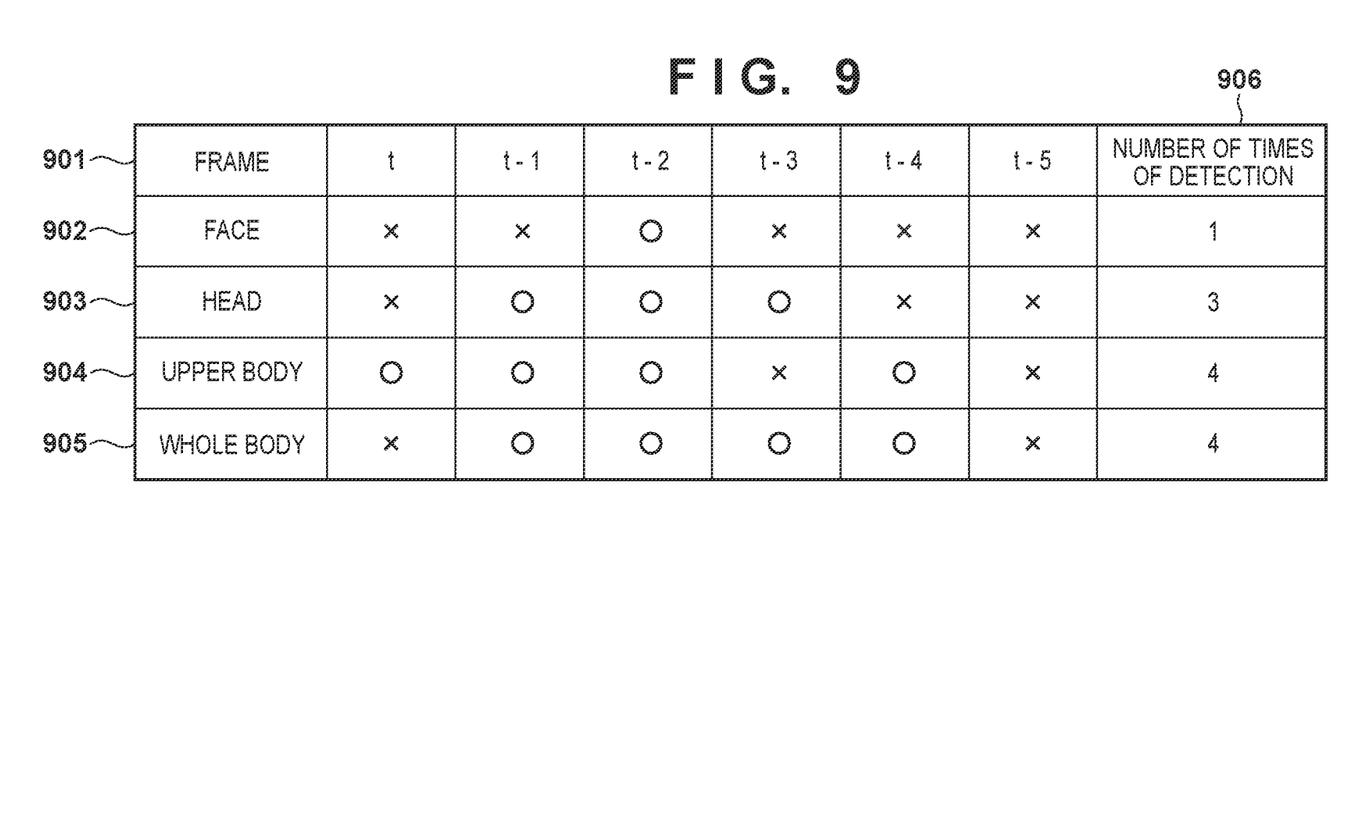
FIG. 9 is a view showing an example of a human body information data structure.

The state determination logic in the second embodiment is basically similar to the first embodiment (FIGS. 3A and 3B) but is different in that a detection result confirmed for each portion is determined in accordance with FIG. 9. Portions different from the first embodiment will be mainly described below.

FIG. 9 is a view showing an example of a human body information data structure according to the second embodiment. Items 901 to 904 are similar to the items 401 to 404 in the first embodiment. However, in the second embodiment, the item 406 in the first embodiment does not exist, but an item 906 is added. The item 906 is the number of times of detection of each portion (the number of circles).

As in the first embodiment, fluctuations exist in the pieces of portion detection information of the respective portions in the items 902 to 905. For this reason, correct detection results are not always obtained for the frames of the preceding and succeeding positions at the timings when the human body passes an intrusion detection line 210. In the second embodiment, the number of times of detection of each portion in several latest frames at the timings when the human body passes the intrusion detection line 210 is used to determine the detection result confirmed for each portion. The state of human body is determined based on a combination of the detection results confirmed for the respective portions.

For example, if the "whole body" is detected in half or more of the several latest frames, it is determined that the "whole body" is detected, and the state of the human body is determined to be during walking. For example, if the "face" or "head" is detected in the half or more of the several latest frames, it is determined that the "face" or "head" is detected, and the state of the human body is determined to be during driving; otherwise, the state of the human body is determined to be unknown. If the state of the human body is detected to be during "walking", the human body is determined as a pedestrian. If the state of the human body is detected to be during "driving", the human body is determined as a driver.

<Operation of Device>

Figure 10:
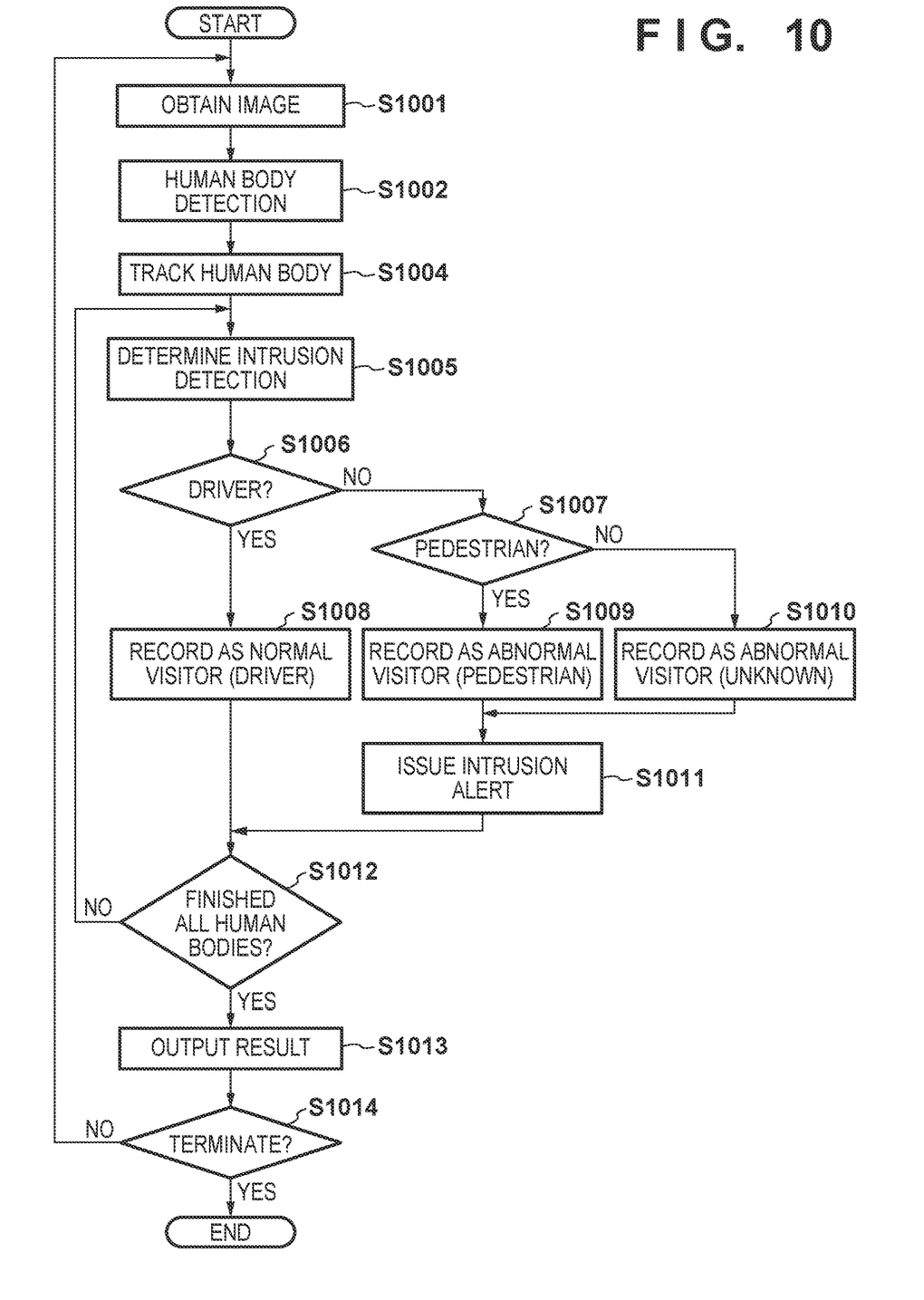
FIG. 10 is a flowchart of an intrusion detection process according to the second embodiment.

FIG. 10 are flowcharts of an intrusion detection process according to the second embodiment. As in the first embodiment, a CPU 501 implements the functional units shown in FIG. 6 by reading programs stored in a ROM 502 to a RAM 503 and executing them.

Processes in steps S1001, S1002, S1004, S1005, and S1008 to S1014 are similar to the processes in S801, S802, S804, S805, and S808 to S814 in the first embodiment (FIG. 8).

In steps S1006 and S1007, a state determination unit 604 determines the state of a human body crossing the intrusion detection line 210. More specifically, it is determined by the method described with reference to FIG. 9 whether the human body is a driver, a pedestrian, or unknown. That is, the number of times of detection of each portion in the several latest frames at timings when a human body passes the intrusion detection line 210 is used to determine the state of the human body.

As has been described above, according to the second embodiment, the human body serving as an intrusion detection target is determined based on the determination result of the detected state of the human body (a driver, a pedestrian, or unknown). Accordingly, the present invention can cope with a use case such that entrance of a vehicle should be excluded from the detection targets. In addition, even if the fluctuations occur in the strong discriminators of the respective portions (even if an error is included in the detection result), the state of the human body can be determined at high accuracy.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-201161, filed Oct. 25, 2018 which is hereby incorporated by reference herein in its entirety.

What is claimed is:

1. A detection device comprising:
   one or more memories storing instructions; and
   one or more processors which, when executing the instructions, causes the detection device to:
      detect a human included in a plurality of frame images;
      determine the detected human as a pedestrian, in a case that a whole body of the detected human is detected more than a first predetermined number of times, and determine the detected human as a passenger in a vehicle, in a case that the whole body of the detected human is not detected more than the first predetermined number of times and a specific portion of the detected human is detected more than a second predetermined number of times; and
      output information if the human determined as the pedestrian intrudes into a specific area, and not output the information if the human determined as the passenger intrudes into the specific area.

2. The device according to claim 1, wherein the human is detected by detecting a plurality of portions of a human body included in the frame image.

3. The device according to claim 2, wherein
   the plurality of the portions of the human body is detected by using a plurality of detectors configured to detect different portions.

4. The device according to claim 3, wherein the plurality of detectors include not less than two detectors configured to detect not less than two of a face of a human body, a head of a human body, an upper half body of a human body, and a whole body of a human body.

5. The device according to claim 1, wherein the one or more processors causes the device to:
   track the detected human over the plurality of frame images, and
   if the tracked human intrudes into the specific area, the tracked human is determined as a pedestrian or a driver.

6. The device according to claim 1, wherein the one or more processors causes the device to: determine whether the human intrudes into the specific area, and
   the plurality of frame images are captured until the human intrudes into the specific area.

7. A control method of a detection device, the method comprising:
   detecting a human included in a plurality of frame images;
   determining the detected human as a pedestrian, in a case that a whole body of the detected human is detected more than a first predetermined number of times, and determine the detected human as a passenger in a vehicle, in a case that the whole body of the detected human is not detected more than the first predetermined number of times and a specific portion of the detected human is detected more than a second predetermined number of times; and
   outputting information if the human determined as the pedestrian intrudes into a specific area, and not outputting the information if the human determined as the passenger intrudes into the specific area.

8. A non-transitory computer-readable recording medium storing a program that causes a computer to function as a detection device comprising:
   one or more memories storing instructions; and one or more processors which, when executing the instructions, cause the detection device to:

detect a human included in a plurality of frame images;

determine the detected human as a pedestrian, in a case that a whole body of the detected human is detected more than a first predetermined number of times, and determine the detected human as a passenger in a vehicle, in a case that the whole body of the detected human is not detected more than the first predetermined number of times and a specific portion of the detected human is detected more than a second predetermined number of times; and output information if the human determined as the pedestrian intrudes into a specific area, and not outputting the information if the human determined as the passenger intrudes into the specific area.

\* \* \* \* \*